Patented May 12, 1936

2,040,236

UNITED STATES PATENT OFFICE 2,040,236

PROCESS OF MAKING BONDED SILICON CARBIDE REFRACTORIES

Raymond C. Benner and George J. Easter, Niagara Falls, N. Y., assignors to The Carborundum Company, Niagara Falls, N. Y., a corporation of Pennsylvania No Drawing. Application June 30, 1932,
Serial No. 620,280

5 Claims. (Cl. 106—9)

This invention relates to processes of manufacturing improved silicon carbide refractories and to the products of such processes. The application is concerned with methods of firing refractory mixtures of silicon carbide and bonds of a stable oxidized character.

By the use of electrothermal means and controlled atmospheres we have found it possible to produce refractories comprising a large proportion of silicon carbide together with certain other highly refractory materials which are fused to bond the whole together without reliance for their bonding action upon their being combined with the silicon carbide or with oxidation products thereof. Such refractories have many points of superiority as will appear below and may be rapidly and cheaply produced by the method herein described.

Silicon carbide refractories have long been highly prized for their high thermal conductivity and for their mechanical strength at high temperatures. There are two principal types of silicon carbide refractories regularly in use. The first of these types is recrystallized silicon carbide. This has been the only form which is serviceable at temperatures above 1600° C. It is formed by molding silicon carbide grains to shape (with the aid of a temporary binder such as cellulose sulfite pitch if found necessary) and heating the molded mass in an electrical furnace to temperatures at which silicon carbide is formed. Such temperatures exceed 2000° C. and may be carried to 2300° C.–2500° C. Under these conditions large crystal aggregates are formed at the expense of the smaller silicon carbide grains and a refractory having a very strong mechanical structure and a high thermal conductivity is formed. A brick made in this way has however a somewhat open permeable structure due to volatilization of the temporary binder and due to the disappearance or reduction in size of numerous smaller grains in the recrystallizing process, in which process the larger grains grow at the expense of the smaller ones. This comparatively open structure so obtained leaves the brick excessively susceptible to oxidation under furnace operating conditions.

The second class of silicon carbide refractories are formed by mixing silicon carbide grain with a binder such as some form of clay or other silicate (with or without the use of a temporary binder) and firing the article at a temperature which vitrifies the binder. It is customary to burn this class of refractories in a fuel fired kiln operating at from 1250° C. to 1500° C. Under such conditions there is always oxidation of some of the silicon carbide to silica. In practice this formation of silica has been beneficial, as it is the combination of this film of silica surrounding each crystal of silicon carbide with the added bond which permits the latter to grip the grain firmly. Any fluxing materials present aid in uniting the bond with this siliceous film. Due to their composition and to their inherent nature such bonds are subject to softening at temperatures of 1500° C. to 1600° C. at the maximum. The field of usefulness of this type of refractory is accordingly limited to approximately 1450° C. to 1600° C. as an upper limit, although below this temperature range such refractories are highly satisfactory.

A principal object of the present invention is a provision of a method of bonding silicon carbide grain in such a manner as to retain substantially the high thermal conductivity of recrystallized silicon carbide and to obtain at the same time a less porous structure than is present in such material. A further object is to obtain a refractory which is mechanically strong above 1500° C. and one which is manufactured in such a manner as to avoid substantial reduction of the bond or oxidation of the silicon carbide grain.

As a bond for our new type of refractory we use a material having a fusion point between the approximate limits of 1800° C. and 2100° C. which bond is non-reactive with silicon carbide at temperatures up to the fusion point of the bond. Such materials combine with the fluxes present in the best commercial grade of silicon carbide to form a bond which sets firmly after heating to temperatures between 1700° C. and 2000° C. Examples of such materials are alumina, magnesia spinel, and certain combinations of magnesia and alumina, or of lime and alumina, or of the foregoing compounds with silica, selecting in each instance those mixtures which have a fusion point between 1800° C. and 2100° C. Where mixtures of the type described are used it is preferable although not essential that they be previously fused together and then pulverized before incorporation in the mix from which the refractory is fabricated.

The melting points of the bonding materials given as examples just above lie far below the temperature of rapid recrystallization of silicon carbide (about 2300° C. and above). The bonds may be used in varying proportions up to approximately 25 per cent. The silicon carbide grain which is to be bonded may be made up of a mixture of different grit sizes to reduce the permeability, in which case the proportion of bond required is somewhat reduced as compared with the amount required when fewer grit sizes are used, 5 to 10% of bond being sufficient for very dense mixtures of grits. For example a mixture can be made of the following grit sizes in the following proportions; the mesh numbers being given to the linear inch:

| Silicon carbide grain | Percentages |
| --- | --- |
| 14–36 mesh | 40 |
| 40–70 mesh | 10 |
| 80 and finer mesh | 50 |

A temporary binder may be used to hold the refractory mixture together during the drying and preliminary firing operation. Examples of such binders are dextrin, cellulose sulfite pitch and sodium silicate. The first two binders just described are carbonaceous binders which decompose during the preliminary stages of the firing process. Sodium silicate if used at all should be used in only such small proportions that it will not flux the bond and in ware intended for service at the highest temperatures should be avoided entirely.

As an example of the method of manufacture of our silicon carbide refractory we take 90 percent by weight of silicon carbide (14 mesh and finer) and 10 percent of magnesium aluminate (80 mesh and finer) and mix it with 2% of cellulose sulfite pitch or dextrin and enough water to cause the particles to cohere when pressed together. The mix is then formed to the desired shape, for example by pressing under heavy hydraulic pressure. The pressed article is then removed from the mold, dried and placed in a graphite crucible which is covered to exclude air and to produce an atmosphere of carbon monoxide around the article during the curing process. The crucible is heated in any suitable manner such as by being made the core of a high frequency induction furnace, and is heated up to 2000° C. in about 35 minutes.

The burning temperature should be carried at least to a point at which the bond softens, that is undergoes incipient fusion. This burning temperature should be at least 95% of the generally recognized ultimate "fusion point" (in degrees centigrade) of the bond. The burning temperature thus depends upon the particular bond used, 2000° C. being about right for the magnesium aluminate (m. p. 2135° C.) of the foregoing example. For a mullite bond, due to its lower melting point (1810° C.) 1700° C. is sufficient. The temperature is in any case too low and the burning time too short to produce any substantial recrystallization of the silicon carbide.

The resultant refractory is very dense and closely bonded in comparison with recrystallized silicon carbide of the usual type. The pores are apparently partially sealed by fusion of the bond in situ, and microscopic examination frequently (particularly when the bond contains silica) also shows a characteristic structure resembling closely packed cobwebs in the pores of the piece. As a result the permeability of the piece to gases is far lower than is that of the regular recrystallized variety of silicon carbide refractory. This is of distinct value in retarding the penetration of oxidizing gases into the refractory in service, thereby retarding oxidation which is the usual cause of destruction of silicon carbide refractories and which proceeds with particular rapidity in the recrystallized variety.

Spalling tests on silicon carbide refractories made by the process described above were carried out by heating the bars to 1000° C. and plunging them into water. The test was repeated ten times. There was very little or no effect on any of the bars.

The principal advantages of the refractory manufactured by the process described above are:

(1) Rapidity of manufacture which makes possible quick deliveries and a minimum investment in material in process.

(2) A silicon carbide refractory suitable for use above 1600° C. and having a low permeability to gases, hence a low oxidation rate.

(3) Low spalling and good thermal conductivity.

(4) Good transverse strength above 1500° C. in contrast to bricks containing silica which softens at temperatures of 1500° C. (or lower where there are fluxing impurities).

While the process of manufacture of silicon carbide refractories which is the subject of the present application has been described particularly with reference to a magnesium aluminate bond, other bonds having similar characteristics may be used as previously noted. It is desirable that the bond should have a high softening point (1800° C.–2100° C.) and that it should not react with the silicon carbide to a material extent during the short time that silicon carbide is in contact with the molten or softened bond.

It is moreover important that the atmosphere within the crucible shall be inert to both the silicon carbide and the bond throughout the temperature range used. A carbon monoxide atmosphere is satisfactory for use with alumina, magnesia, lime and mixtures thereof, but where silica is a principal constituent of the bond a more inert atmosphere such as nitrogen or helium is preferable. Such atmospheres are readily secured by introducing a slow stream of the desired gas into the crucible under slight pressure.

The extreme rapidity of heating possible with a high frequency induction furnace is believed to be beneficial also as it permits sintering of the bond in situ without requiring that the high temperature be maintained for so long a time as to result in either recrystallization of the silicon carbide or in its reaction with the bond.

We claim:

1. The step in the method of making silicon carbide refractories containing at least eighty per cent of silicon carbide with the remainder composed substantially of magnesium aluminate, which step comprises heating up the refractory mixture rapidly in a non-oxidizing atmosphere to a temperature at which the bond softens, the firing being continued long enough to soften the bond but not long enough to cause recrystallization of the silicon carbide.

2. A refractory article composed of granular silicon carbide and a binder consisting of a combination of magnesia and alumina, said binder having a softening point over 1800° C. and below 2100° C., said refractory article having been fired sufficiently to cause softening of the binder under conditions substantially preventing both oxidation of and recrystallization of the silicon carbide and decomposition of the binder.

3. The method of making a refractory body which comprises admixing silicon carbide granules and a binder composed of a combination of alumina and magnesia, forming said admixture into an article, and burning said article to vitrify said binder under conditions substantially preventing both oxidation and recrystallization of the silicon carbide.

4. The method of making a bonded silicon carbide refractory article which comprises forming a molded article containing silicon carbide as the filler and a binder which is non-reactive therewith, unaffected by an atmosphere sufficiently reducing to prevent oxidation of the silicon carbide, and having a fusion point between 1800° C. and 2100° C., and heating the said article to the point of incipient fusion of the binder in a reducing atmosphere to prevent oxidation of the silicon carbide.

5. The method of making a bonded silicon carbide refractory article which comprises forming a molded article containing silicon carbide as the filler and a binder which is non-reactive therewith, unaffected by an atmosphere sufficiently reducing to prevent oxidation of the silicon carbide, and having a fusion point between 1800° C. and 2100° C., and heating the said article at a temperature 5% below the centigrade ultimate fusion point of the binder in a reducing atmosphere to prevent oxidation of the silicon carbide.

RAYMOND C. BENNER.
GEORGE J. EASTER.